United States Patent
Klein et al.

(10) Patent No.: US 10,519,652 B2
(45) Date of Patent: Dec. 31, 2019

(54) JOINT-SEALING TAPE WITH PREDETERMINED GEOMETRY AND SEALING ARRANGEMENT WITH SUCH JOINT SEALING TAPE

(71) Applicant: HILTI AKTIENGESELLSCHAFT, Schaan (LI)

(72) Inventors: Manfred Klein, Kaufering (DE); Christian Foerg, Lamerdingen (DE); Markus Koegler, Buchloe (DE); Mario Paetow, Igling (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/550,578

(22) PCT Filed: Feb. 5, 2016

(86) PCT No.: PCT/EP2016/052461
§ 371 (c)(1),
(2) Date: Aug. 11, 2017

(87) PCT Pub. No.: WO2016/128304
PCT Pub. Date: Aug. 18, 2016

(65) Prior Publication Data
US 2018/0044913 A1 Feb. 15, 2018

(30) Foreign Application Priority Data
Feb. 13, 2015 (EP) .................................. 15155102

(51) Int. Cl.
*E04B 1/94* (2006.01)
*E04B 2/74* (2006.01)
(Continued)

(52) U.S. Cl.
CPC .................. *E04B 1/948* (2013.01); *C09J 7/26* (2018.01); *E04B 1/946* (2013.01); *E04B 1/947* (2013.01);
(Continued)

(58) Field of Classification Search
CPC .......... E04B 1/948; E04B 1/946; E04B 1/947; E04B 2/7411; E04B 1/6812; E04B 1/6813
See application file for complete search history.

(56) References Cited

U.S. PATENT DOCUMENTS 1,960,137 A * 5/1934 Brown .................. E04B 1/6812
2/338
3,041,682 A * 7/1962 Alderfer ................. E06B 7/231
428/129
(Continued)

OTHER PUBLICATIONS

International Search Report dated Apr. 18, 2016, in PCT/EP2016/052461 filed Feb. 5, 2016.

*Primary Examiner* — Paola Agudelo
(74) *Attorney, Agent, or Firm* — Grüneberg and Myers PLLC

(57) ABSTRACT

A joint-sealing tape is useful for sealing building-structure joints, especially for sealing against sound and/or smoke and if necessary against fire. In particular, the joint-sealing tape is suitable for sealing a joint between a first building part and a second building part, with a sealing element and an adhesive layer, which sealing element has a predetermined geometry. Furthermore, a sealing arrangement contains such a sealing tape and is suitable for sealing of building structure joints, especially for sealing against sound and/or smoke and if applicable against fire.

20 Claims, 10 Drawing Sheets

(51) Int. Cl.
*C09J 7/26* (2018.01)
*E04B 1/68* (2006.01)
*C09K 21/14* (2006.01)

(52) U.S. Cl.
CPC ......... *E04B 2/7411* (2013.01); *C09J 2400/24* (2013.01); *C09J 2421/006* (2013.01); *C09J 2475/006* (2013.01); *C09K 21/14* (2013.01); *E04B 1/6812* (2013.01); *E04B 1/6813* (2013.01); *E04B 2/7457* (2013.01)

(56) References Cited

U.S. PATENT DOCUMENTS

| | | | | |
|---|---|---|---|---|
| 4,084,348 A * | 4/1978 | Hast | ..................... | E06B 7/231 428/129 |
| 4,617,220 A * | 10/1986 | Ginster | ................ | E06B 7/2309 428/122 |
| 5,215,806 A * | 6/1993 | Bailey | ..................... | E04B 1/948 428/121 |
| 5,505,497 A * | 4/1996 | Shea | ..................... | F16L 21/005 24/271 |
| 5,765,332 A * | 6/1998 | Landin | ................... | E04B 1/948 52/235 |
| 6,076,834 A * | 6/2000 | Jornhagen | ............ | B28B 21/563 277/604 |
| 6,110,312 A * | 8/2000 | Arnold | ............... | B29D 99/0053 156/204 |
| 8,318,304 B2 * | 11/2012 | Valenziano | ............... | B32B 1/08 428/370 |
| 2010/0009118 A1 * | 1/2010 | Deiss | ................... | E04B 1/6812 428/121 |
| 2011/0011019 A1 | 1/2011 | Stahl, Jr. et al. | | |
| 2011/0113709 A1 * | 5/2011 | Pilz | ........................ | E04B 1/948 52/232 |
| 2012/0023846 A1 * | 2/2012 | Mattox | ................... | E04B 1/948 52/232 |
| 2012/0031032 A1 * | 2/2012 | Deiss | ................... | E04B 1/6809 52/506.05 |
| 2012/0198784 A1 * | 8/2012 | Shaw | ..................... | E04B 1/948 52/515 |
| 2013/0031856 A1 * | 2/2013 | Pilz | ...................... | E04B 2/7457 52/232 |
| 2013/0091790 A1 | 4/2013 | Stahl, Jr. et al. | | |
| 2013/0154201 A1 * | 6/2013 | Kethorn | ................... | F16J 15/02 277/630 |
| 2014/0075865 A1 * | 3/2014 | Pilz | ...................... | E04B 2/7411 52/232 |
| 2015/0013254 A1 | 1/2015 | Pilz et al. | | |
| 2015/0275510 A1 * | 10/2015 | Klein | ..................... | E04B 1/948 52/232 |

* cited by examiner

JOINT-SEALING TAPE WITH PREDETERMINED GEOMETRY AND SEALING ARRANGEMENT WITH SUCH JOINT SEALING TAPE

FIELD OF THE INVENTION

The present invention relates to a joint-sealing tape as well as a sealing arrangement with such joint-sealing tape for sealing of building structure joints, especially for sealing against sound and smoke and if applicable against fire. In particular, the invention relates to acoustic, smokeproof and/or fireproof sealing of connecting joints in drywalls, especially of expansion joints.

BACKGROUND OF THE INVENTION

Connecting joints are usually formed when different building parts meet. Connecting joints are found in the region of connection to the inter-story ceiling, to the floor and to massive walls. Due to weight loading or thermal influences, the ceiling in buildings may be forced upward or downward. To prevent damage to the drywall, the upper connecting joint in this case is made as an expansion joint. Thus joints for creating discontinuities in building parts in order to prevent stress cracking are known as expansion joints. The ceiling profile is made in such a way that a relative movement between ceiling profile and the vertical wall components is possible.

In general, a channel profile constituting part of the studwork is fastened to the connecting building parts. The gypsum boards themselves are attached at a well-defined spacing to the connecting building part. Usually sealing of the system is provided in the gap between gypsum board and ceiling. For this purpose, either a suitable sealing compound is introduced or else the gap is filled with mineral wool and provided at the surface with a sealing layer. In both cases, the material present in the joint presents relatively strong resistance to movement, with the consequence that comparatively large joint widths are necessary in order to achieve adequate movement absorption.

In particular, sealing of the gap with sealing compound has some disadvantages. It is particularly laborious, and in the course of time the sealing tends to crack when overloaded. Furthermore, sealing can be performed only after the gypsum boards have been mounted, and it requires access to the finished drywall from both sides. Furthermore, this procedure is error-prone, since the user himself or herself must dose the correct quantity of material in order to seal the gap adequately. Above and beyond this, the drywall builder must make the width of the joint correspond to the material and expansion properties of the sealing compound. During installation of the sealing compound, nothing but the joint can be filled. During expansion of the gap, it must be ensured that the sealing compound adheres sufficiently strongly to the underlying surface and that it is able to absorb the tensile forces that develop. Frequently this not the case, and the danger exists that the sealing compound will become detached from the underlying surface or that the sealing compound itself will be overloaded and tear. In the case of a narrower gap, the sealing compound can be compressed to only a limited extent, because of its material properties, and the danger exists that it will be forced out of the gap if the joint is incorrectly dimensioned. Due to the limited expansion and compression capability of the sealing compound (max.+/−25%), it is very important to ensure adequately large dimensioning of the spacing between gypsum board and ceiling. This is frequently underestimated, and so adequate imperviousness often cannot be guaranteed during use of customary sealing compounds.

Some further approaches exist for sealing of joints, especially joint cords or joint sprays, which to some extent suffer from the same disadvantages as have been described for sealing compounds.

The object of the present invention is therefore to provide a joint-sealing tape that avoids the disadvantages of the known materials, that in particular is easier and safer to use, simplifies the mounting of further building parts and ensures good sealing as soon as it is applied as well as excellent imperviousness with maximum absorption of movement.

A further object of the present invention is to provide an arrangement that, in the event of fire, permits better sealing of the joint between two building parts, especially between a drywall and a connecting building part, such as a wall, a ceiling or a floor, and thus provides better and durable sealing against sound and/or smoke and if necessary better and durable fire protection, and can be mounted reliably and free of defects with little work effort.

This and further objects that will become apparent from the description of the invention hereinafter are solved by the present invention, as described in the independent claims. The dependent claims relate to preferred embodiments.

SUMMARY OF THE INVENTION

The present invention relates to a joint-sealing tape for sealing a joint between a first building part and a second building pail, with a sealing element and an adhesive layer, which is characterized in that the sealing element has a predetermined geometry.

The present invention further relates to a sealing arrangement for sealing a joint between two juxtaposed building parts of a building construction and/or of a building structure with at least one first building part, one second building part and the joint-sealing tape described in the foregoing, wherein the sealing element is positioned in the upper region of the joint and is configured to seal the joint from the outside.

Some other objects and features of this invention are obvious and some will be explained hereinafter. In particular, the subject matter of the present invention will be described in detail by reference to the following figures:

BRIEF DESCRIPTION OF THE FIGURES

FIG. 1b shows a cross section through the embodiment of an inventive joint-sealing tape shown in FIG. 1a.

FIG. 2b shows a cross section through the embodiment of an inventive joint-sealing tape shown in FIG. 2a.

FIG. 3b shows a cross section through the embodiment of an inventive joint-sealing tape shown in FIG. 3a.

FIG. 4b shows a cross section through the embodiment of an inventive joint-sealing tape shown in FIG. 4a.

FIG. 5b shows a cross section through the embodiment of an inventive joint-sealing tape shown in FIG. 5a.

DETAILED DESCRIPTION OF THE INVENTION

Figure 1A:
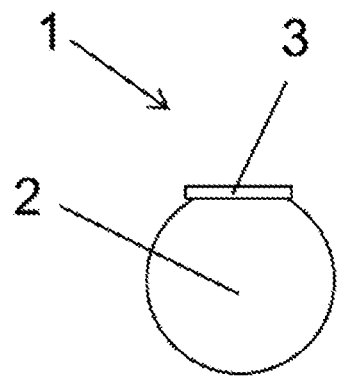
FIG. 1a shows a sketched front view of a joint-sealing tape with a sealing element and an adhesive layer according to one embodiment of the present invention, wherein the sealing element has a solid profile and round profile.

The following terms are used within the scope of the present invention:

Within the scope of the present invention, the term "geometry/geometries" comprises various cross-section types and cross-section shapes. This means that the sealing element may have different cross-section types and cross-section shapes. Cross-section types are understood among other possibilities as round profile (round cross section), polygonal profile (polygonal cross section), especially square profile (square cross section), rectangular profile (rectangular cross section), parallelogram profile (cross section in the shape of a parallelogram), etc. Cross-sectional shapes are understood among other possibilities as solid profile and hollow profile, wherein solid profile means that the sealing element consists completely of sealing material while the hollow profile means that the sealing element consists only partly of sealing material.

Within the scope of the present invention, the term "deformable" means that irregularities in the building part, against which the sealing element is pressed, can be evened out. In this connection, "plastically deformable" means that the sealing element is deformable and no longer returns to its original shape after deformation. Analogously, "elastically deformable" means that the sealing element is deformable and returns to its original shape after deformation, i.e. the material can be deformed reversibly to a certain extent.

The terms "exhibit", "with" and "have" are intended to be inclusive and mean that elements other than those cited may also be meant.

Within the scope of the present invention, the term "intumescence" means that, under the effect of heat, for example in the event of a fire, the material swells and forms an insulating layer of flame-retardant material, i.e. intumesces.

Within the scope of the present invention, "slow-burning foam" is understood as a foam that offers no possibility of fire propagation due to the foam, is not spontaneously flammable and also does not drip.

"Positioned in the upper region of the joint" means that this joint sealing tape is disposed in particular on the second building part, preferably a ceiling.

Within the scope of the present invention, the term "adhesive layer" means in particular a self-adhesive layer, but it may also be present in the form of interlocking or frictionally acting means, such as suitable profiled shapes or putty material, or may be produced by means of a separately applicable adhesive or the like.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

In one aspect, the present invention relates to a joint-sealing tape for sealing a joint between a first building part and a second building part, with a sealing element and an adhesive layer, characterized in that the sealing element has a predetermined geometry.

In a further aspect, the present invention relates to a sealing arrangement for sealing a joint between two juxtaposed building parts, with at least one first building part, one second building part and the joint-sealing tape described in the foregoing, wherein the joint-sealing tape is positioned in the upper region of the joint and is configured to seal the joint from the outside.

It has been discovered that the inventive joint-sealing tape is particularly suitable for safely sealing, in simple manner, a building-structure joint between two adjacent building parts, especially against sound and/or smoke and if necessary also against fire. For the joint-sealing tape to be able to fulfill its function, the sealing element of the joint-sealing tape must have a predetermined geometry. Furthermore, the joint-sealing tape must be positioned in the upper region of the joint and be configured such that it can seal the joint from the outside.

Therefore it is an objective of the present invention to describe the sealing element. In particular, it is an objective of the present invention to describe the geometry of the sealing element in detail. Furthermore, it is an objective of the present invention to describe the positioning of the joint-sealing tape, especially a sealing arrangement.

The inventive joint-sealing tape for sealing a joint between a first building part and a second building part, with a sealing element and an adhesive layer, is characterized in that the sealing element has a predetermined geometry. As already mentioned hereinabove, geometries within the scope of the present invention comprise various cross-section types and cross-section shapes.

Preferred cross-section types of the sealing element according to the present invention are solid profiles, wherein the hollow profile may be a closed or open hollow profile. Solid profiles and hollow profiles with large profile wall thicknesses have the advantage that automatically no gaps develop at the abutting surface between sealing elements in contact with one another. Hollow profiles can be compressed to a greater extent and thus absorb more movement. Particularly preferably, the sealing element has a solid profile.

Preferred cross-section shapes of the sealing element according to the present invention are round profile, polygonal profile, especially rectangular profile, square profile, parallelogram profile and triangular profile. Round profile and rectangular profile are particularly preferred, but rectangular profile is the most preferred. Nevertheless, other or mixed cross-section shapes are also conceivable and possible, as long as the joint-sealing tape adjoins both building parts after installation of the sealing element and is able to close the joint that is present between the building parts.

In a preferred embodiment of the inventive joint-sealing tape, the sealing element has a round profile.

In a further preferred embodiment of the inventive joint-sealing tape, the sealing element has a rectangular profile.

In a particularly preferred embodiment of the inventive joint-sealing tape, the sealing element has a solid profile and a round profile.

In a further particularly preferred embodiment of the inventive joint-sealing tape, the sealing element has a solid profile and a rectangular profile.

The geometry of the sealing elements may be prefabricated, for example by well-defined cutting to size, extrusion or pressing of suitable sealing material or can be manufactured directly from flat material, for example by means of folding or rolling from a flat starting material, for example from fabric, especially from an incombustible material, such as inorganic fibers, for example glass fibers, a nonwoven fabric or the like. The manufacture of such cross-section types and cross-section shapes is known to the person skilled in the art. Preferably the geometry of the sealing element is prefabricated by well-defined cutting to size or extrusion.

The inventive sealing element may consist of one piece made from one material or of multiple parts made from several materials and, for example, may exist as a layered body. In alternative embodiments, the outer region and the inner region of a sealing element may define separate regions of the sealing element, which may have different cross-section shapes and/or cross-section types and/or may consist of different materials.

According to the invention, the sealing element consists of a deformable material. This material may be either plastically or elastically deformable. In particular, the sealing element consists at least partly, preferably completely of a material that is resilient after compression, such as foam, sponge rubber, cellular rubber or the like. The inventive sealing element preferably consists of a soft foam that is resilient after compression. Common foams such as polyethylene and polyurethane foams or cellular rubber can be mentioned as foam material. This foam may be an open-celled foam with very low air passage resistance, or else an approximately closed-celled foam with extremely low air permeability values. Even foams with air permeability values lying between the two extreme cases mentioned in the foregoing may be used within the scope of the present invention. The foam may be impregnated with an impregnating agent that increases the sealing properties of the foam. In order to achieve imperviousness to smoke, at least the outer surface of the sealing element must be of closed-pore nature. Alternatively, an open-celled sealing element may be provided with a covering layer or jacket, for example of a film, especially plastic film. Preferably, the sealing element consists of an open-celled polyurethane foam or of a cellular rubber.

It has proved advantageous when the sealing element consists of a slow-burning foam, such a cellular rubber or polyurethane foam, for example. In the case of a slow-burning foam, there is no possibility that fire will be propagated by the foam. Spontaneous inflammation is ruled out by the above-mentioned foam-type starting materials. It is also advantageous that no dripping occurs in the event of fire. A slow-burning foam should still have at least 20%, still at least 25%, preferably still at least 30%, between 20% and 60%, between 20% and 40%, preferably between 25% and 30% of its initial volume in a temperature range between 500° C. and 800° C. Furthermore, a slow-burning foam should still have at least 10%, at least 20%, preferably still at least 30%, between 10% and 40%, between 10% and 30%, preferably between 15% and 20% of its initial mass in a temperature range between 500° C. and 800° C.

Furthermore, the material may contain appropriate additives if fire protection properties such as intumescence, for example, are desired. Under the effect of heat, such as in the event of fire, the material swells and forms an insulating layer of flame-retardant material. The formation of a voluminous insulating layer, namely an ash layer, may take place due to the chemical reaction of a mixture of compounds that are appropriately matched to one another and that react with one another under the effect of heat. Such systems are known to the person skilled in the art as chemical intumescence, and they may be used according to the invention. Alternatively, the voluminous insulating layer may be formed by swelling of an individual compound, which releases gases under the effect of heat, even though no chemical reaction has occurred between two compounds. Such systems are known to the person skilled in the art as physical intumescence, and they may also be used according to the invention. According to the invention, the two systems may be used respectively alone or together as a combination.

In a preferred embodiment of the inventive joint-sealing tape, the sealing element consists of an open-celled foam.

In a further preferred embodiment of the inventive joint-sealing tape, the sealing element consists of a closed-celled foam.

In a particularly preferred embodiment of the inventive joint-sealing tape, the sealing element consists of an open-celled polyurethane foam.

In a further particularly preferred embodiment of the inventive joint-sealing tape, the sealing element consists of a cellular rubber.

In one embodiment of the inventive joint-sealing tape, the sealing element is firmly surrounded at least over part of its circumference by a covering layer or jacket, for example of a film, especially plastic film.

In a further embodiment of the inventive joint-sealing tape, the sealing element is firmly surrounded over its entire circumference by a covering layer or jacket, for example of a film, especially plastic film. Thus an open-celled foam material may be used for the sealing element.

For manufacturing reasons, it may be advantageous to provide the sealing element with a projecting film, such as a film strip.

The adhesive layer of the inventive joint-sealing tape may be produced in the form of an adhesive layer, especially a self-adhesive layer, in the form of interlocking or frictionally acting means, such as suitable profiled shapes or putty material or by means of a separately applicable adhesive or the like. Synthetic adhesives such as acrylate adhesives or hot-melt adhesives may be used in the present invention, although silicone-base adhesives are also conceivable. Preferably the adhesive layer of the joint-sealing tape is a self-adhesive layer.

Positioning of the joint-sealing tape on the building part may also be achieved by fastening means, for example in the form of the just-mentioned adhesive layer, especially a self-adhesive layer, in the form of interlocking or frictionally acting means, such as suitable profiled shapes or putty material, by means of a separately applicable adhesive or the like. Preferably the joint-sealing tape is positioned on the connecting building part by means of a self-adhesive layer.

Attachment, especially adhesive bonding, of the inventive joint-sealing tape may be achieved over an area or only at spots, preferably by pressing it on. Specifically, adhesive bonding is necessary only for temporary fixation of the joint-sealing tape. As soon as the gypsum board has been mounted, the joint-sealing tape is held in place by the precompression.

If the sealing element is provided with a projecting film, the adhesive layer is applied on the projecting film strip, which is bent over and then the joint-sealing tape is applied on the building part.

The dimension and the materials of the joint-sealing tape are chosen to correspond to the planned use of the joint-sealing tape.

In general, the dimension of the joint-sealing tape is chosen as a function of the profiles being used and of the material being used. The dimension must be chosen such that the joint-sealing tape fills the gap between the gypsum board and the ceiling and bears sealingly both on the ceiling and on the gypsum board. If a vertical movement of the gypsum boards is to be permitted, the joint-sealing tape must follow the movement of the gypsum board, so that the contact with the gypsum board is not torn apart and no gaps are able to form between joint-sealing tape and gypsum board. For this purpose, the sealing element of the joint-sealing tape preferably consists of resilient and compressible material and is appropriately precompressed during mounting of the gypsum board, so that a downward movement of the gypsum board, whereby the gap between this and the ceiling becomes larger, can be followed. In this way, the preadjusted freedom of movement of the gypsum board determines the dimension of the sealing element and thus of the joint-sealing tape.

As an example, it must be pointed out that the height of the narrow side of a rectangular sealing element will be chosen as a function of the desired use of the joint-sealing tape, in which case the height for a single-boarded arrangement will be chosen as approximately the thickness of one gypsum board and the height for a double-boarded arrangement will be chosen as approximately twice the thickness of one gypsum board. In the case of a single-boarded arrangement, however, it is also possible to use the joint-sealing tape designed for a double-boarded arrangement.

As an example, it must also be pointed out that material and geometry of the sealing element may be chosen in such a way that its hardness or compressibility is adjusted such that the sealing element is compressed to a well-defined height merely by the dead weight of the gypsum board in the floor region, for example by constructing the sealing element as two layers of foam materials with different compression density. In this way a correct spacing between floor and gypsum board can be adjusted without further measurement. This is necessary in particular whenever damage to the gypsum board by rising dampness must be prevented.

The invention will be described in more detail hereinafter on the basis of the application of the joint-sealing tape on a channel profile of a drywall studwork, without hereby restricting the scope of protection.

To create an inventive sealing arrangement, the inventive joint-sealing tape, after attachment of a first building part, is positioned on a second building part, especially abuttingly with the first building part. Preferably, the first building part is a frame profile of a drywall studwork, for example a channel profile, and the second building part is a wall, a ceiling or a floor of a building structure. Particularly preferably, the first building part is a channel profile and the second building part is a ceiling. In this arrangement, the joint-sealing tape is positioned in the upper region of the joint and is configured to seal the joint from the outside.

In one possibility for sealing a connecting joint in dry construction, after a profile, especially a channel profile, has been attached to the connecting building parts, such as a ceiling, wall or floor, the inventive joint-sealing tape is positioned on or in front of that channel profile and fixed on the connecting building part, preferably a ceiling. In a further operation, the gypsum boards, whether they have one or two layers, are pressed at the end face against the sealing element, so that, in the case of a double-boarded arrangement, the two gypsum boards come into contact via respectively their top edge with the sealing element, especially with the sealing strip, and thereby sealing of the joint is achieved. In order to permit movement of the gypsum boards without the formation of a gap between the sealing element and the gypsum board or the gypsum board(s) in the case of maximum movement, the sealing element must be compressed during mounting of the gypsum board(s). As soon as the gypsum board has been mounted, the joint-sealing tape is held in place by the precompression. Furthermore, any irregularities that were present are closed by this compression.

For this purpose, the material and the thickness of the sealing element are respectively chosen such that the sealing element does not hinder the movement of the gypsum board(s) and, at maximum joint width, the top edge of the gypsum board(s) still remains in contact with the sealing element, in order to ensure adequate sealing against gases. The width of the sealing element is preferably chosen such that it corresponds approximately to twice the width of one gypsum board. It has been found that sufficient sealing may also be achieved when the width of the sealing element corresponds to the width of only one gypsum board.

When the joint-sealing tape is disposed on the ceiling and abutted with the channel profile, irregularities in both building parts can be evened out and simple positioning with adhesive bonding on only one building part is possible. Furthermore, the joint spacing can be controlled by the subsequent positioning of the gypsum board as well as by the choice of sealing materials and/or geometric configuration of the joint-sealing tape.

Alternatively, when only one gypsum board is used, it may be mounted not from underneath in a manner abutting the sealing element, but instead in such a way that the gypsum board partly overlaps the sealing element. Thereby the gypsum board partly overlaps the sealing element, and the overlapping part of the sealing element is pressed between the channel profile and the gypsum board. It has been found that sufficient sealing can also be achieved hereby, especially against gases. To improve the imperviousness and/or the sliding properties, the sealing tape may be partly laminated with a layer of material, such as a plastic film, for example, that neither hinders the movement of the gypsum board nor is destroyed by it. As an example, the positioning marking for the gypsum board may be easily applied on a film.

In this type of mounting, a large capacity for absorbing movement relative to the joint width is possible. Furthermore, this type is more mounting-friendly than the aforementioned single-boarded or double-boarded arrangement, since the gypsum board can be mounted simply on the sealing element without the need to measure the spacing. If positioning marking is used, the gypsum board can be mounted without measurement of the spacing. Above and beyond this, there is no need to use readily compressible materials for the sealing elements in this type of mounting, thus permitting relatively broad discretion in the choice of material.

In a further particularly preferred alternative, sealing of the joint can be achieved when, in the case of a double-boarded arrangement, the two gypsum boards are mounted with a horizontal offset in such a way that the outer of the two gypsum boards (also referred to as the outer, second gypsum board) is mounted higher (i.e. closer to the ceiling) than the inner gypsum board (also referred to as the inner, first gypsum board). In this embodiment, the thickness of the sealing element is chosen to correspond to the thickness of one gypsum board. The first, inner gypsum board is mounted in such a way that its top edge contacts the end faces of the sealing element, in which case zero or little precompression of the sealing element is necessary. The second, outer gypsum board is attached at a horizontal offset, i.e. it is mounted higher than the first, inner gypsum board, so that it partly overlaps the sealing strips. In this case the sealing element and the gypsum board should bear sealingly on one another, in order to seal the gap between the outer, second gypsum board and the sealing element, especially against gases. Thus sealing is achieved between sealing element and the second building part, such as a ceiling, a wall or a floor, as well as between sealing element and outer, second gypsum board.

An empty gap remains between the second building part, such as a ceiling, a wall or a floor, and the outer, second gypsum board. In the case of a vertical movement of the second building part or of the gypsum boards, this gap is completely available to absorb movement.

Depending on how far the outer, second gypsum board overlaps the sealing element (size of the offset), a movement in the other direction may also be absorbed. In this case, it is important that an overlap is still ensured between the second gypsum board and the sealing strip. Preferably, therefore, the dimension of the sealing element is chosen such that its thickness is somewhat larger than the thickness of one gypsum board and its height comprises somewhat more than the maximum permissible movement of the building parts (maximum joint width).

By the fact that the thickness of the sealing element is larger than the thickness of the gypsum board, the gypsum board is pushed against the sealing element and somewhat compressed while it is being mounted, whereby the gap between sealing element and gypsum board is reliably sealed, especially against gases.

For easier adjustment of the correct joint dimension in the outer, second gypsum board, markings referred to as positioning marking may be made laterally on the joint-sealing tape. To improve the imperviousness and/or the sliding properties, the sealing tape may be laminated on one side with a layer of material, such as a plastic film, for example, that neither hinders the movement of the gypsum board nor is destroyed by it. As an example, the positioning marking for the outer, second gypsum board may be easily applied on a film.

In this type of mounting, maximum absorption of movement relative to the joint width is possible. Furthermore, this type is very mounting-friendly, since firstly the first gypsum board can be mounted simply on contact with the sealing element without the need to measure the spacing. Secondly, especially if positioning marking is used, the second gypsum board can also be mounted without measurement of the spacing. Above and beyond this, the broadest possible discretion in the choice of material for the sealing elements is achieved by this type of mounting, since these are compressed only slightly and thus only slight requirements are imposed on the compressibility of the sealing element.

According to the invention, the joint-sealing tape can be on all kinds of connecting joints in which one building part meets another building part. Accordingly, the joint-sealing tape may be used on all profiles, even closed profiles or wooden beams, which must be sealed to a connecting face.

A particularly preferred use of the joint-sealing tape relates to the sealing of profiles in dry construction, wherein the first building part is a ceiling, floor or wall profile or a metal or wood studwork of a dry construction element, and the second building part is a floor, a ceiling or a wall of a building element, for example a masonry structure or concrete building element. The profile may be any of the profiles commonly used for dry construction, regardless of whether it has a slotted or non-slotted web or slotted or non-slotted flange. The further building parts are gypsum boards, which bear closely on the profiles and are fastened to the studwork. In order to permit vertical movement of the gypsum boards, for example in the event of an earthquake, the gypsum boards are mounted to be vertically movable at a spacing from a wall, a floor or a ceiling. Thereby a space (also referred to as joint herein) is formed between the gypsum board and the wall, the floor or the ceiling. This joint is filled by the sealing element of the joint-sealing tape, so that the sealing element seals the joint against sound and/or smoke and, depending on material of the sealing element, also against fire if necessary.

Without restricting the scope of protection of the invention, the invention will be described in more detail on the basis of special embodiments of the joint-sealing tape as well as its positioning. In these embodiments, the joint-sealing tape is applied to the connecting joints in drywalls. It is clear to the person skilled in the art that the sealing tape may also be applied to building-structure joints of other types.

Figure 1B:
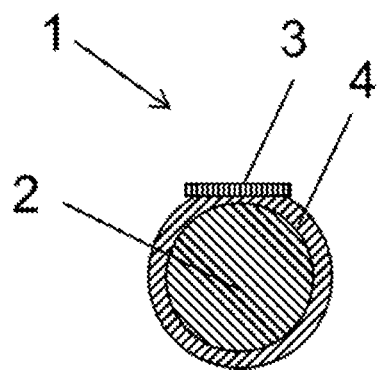
Figure 1C:
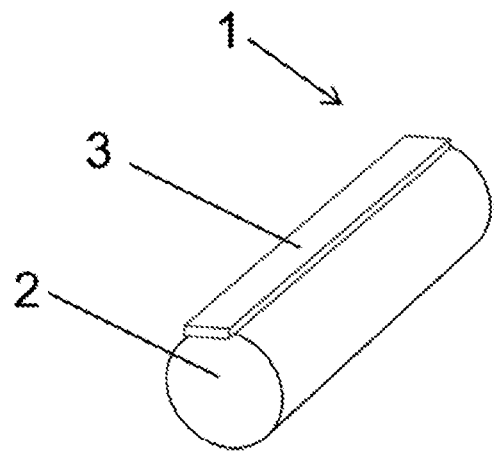
FIG. 1c shows a perspective view of the embodiment of an inventive joint-sealing tape shown in FIGS. 1a and 1 b.
Figure 1D:
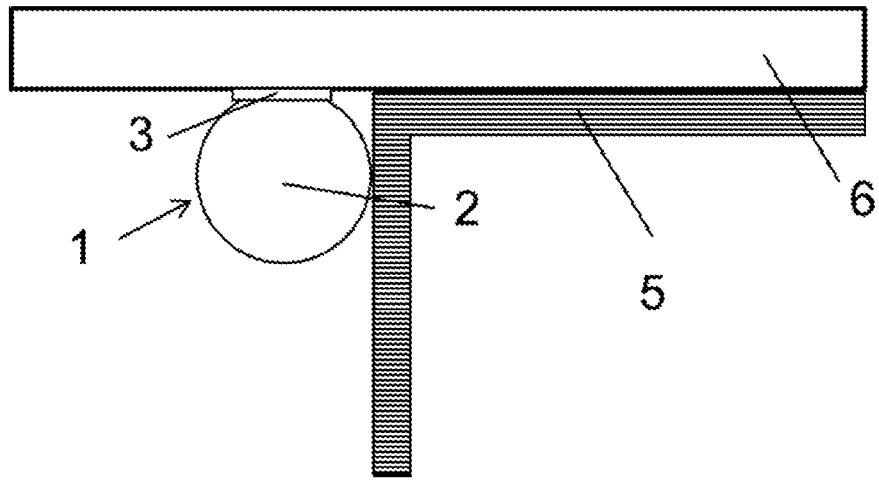
FIG. 1d shows a sketched sealing arrangement with the embodiment of an inventive joint-sealing tape shown in FIGS. 1a to 1c.
Figure 1E:
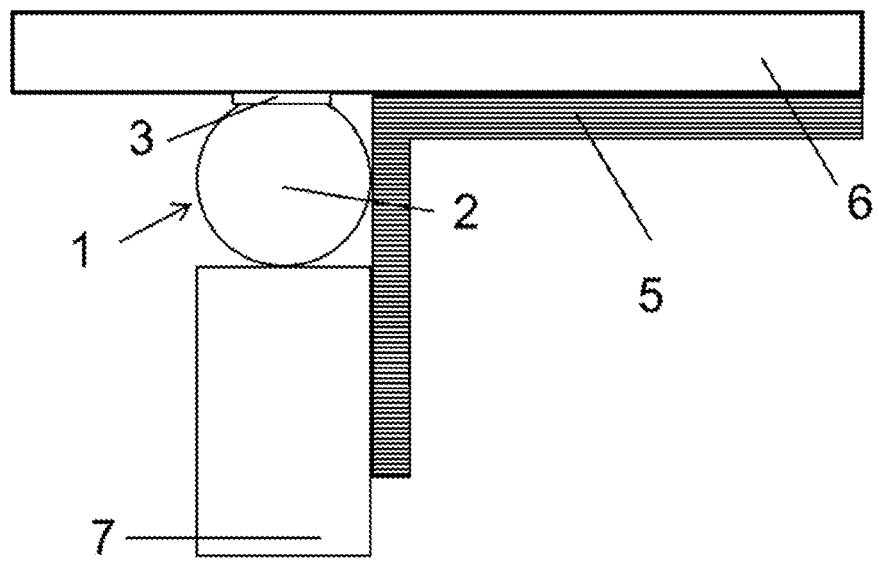
FIG. 1e shows a sectional view through a finished building element with the embodiment of an inventive sealing arrangement shown in FIG. 1d.

A preferred embodiment of an inventive joint-sealing tape 1 is shown in FIGS. 1*a* to 1*c*. Joint-sealing tape 1 comprises a sealing element 2 and an adhesive layer 3. Sealing element 2 has a round profile and a solid profile. Furthermore, sealing element 2 is surrounded completely, i.e. over its entire circumference, by a covering layer 4. Sealing element 2 consists of a compressible foam, which if necessary contains fire-protection additives, and covering layer 4 consists of a plastic film. FIG. 1d illustrates a sealing arrangement with the embodiment of an inventive joint-sealing tape shown in FIGS. 1a to 1c, wherein joint-sealing tape 1, after attachment of a channel profile 5, is positioned on a ceiling 6 and abuttingly with channel profile 5 and is fixed on ceiling 6. FIG. 1e shows a sectional view through a finished building element with the embodiment of an inventive sealing arrangement shown in FIG. 1d, wherein the sealing element is positioned in the upper region of the joint and is configured to seal the joint from the outside. In particular, the stepwise procedure for manufacturing a finished building element by means of the embodiment of an inventive joint-sealing tape shown in FIGS. 1a to 1c, for sealing a gap between a ceiling 6, channel profile 5 of a drywall studwork and a gypsum board 7, is sketched in FIG. 6.

Figure 2A:
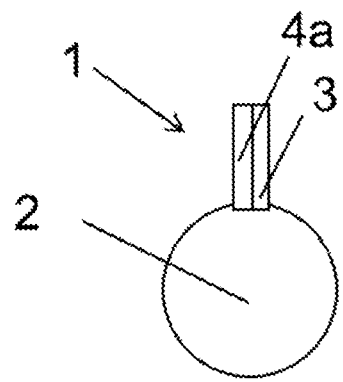
FIG. 2a shows a sketched front view of a joint-sealing tape with a sealing element and an adhesive layer according to one embodiment of the present invention, wherein the sealing element has a solid profile and round profile and wherein the sealing element is provided with a projecting film.
Figure 2B:
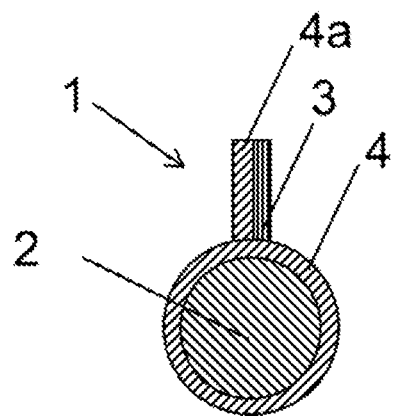
Figure 2C:
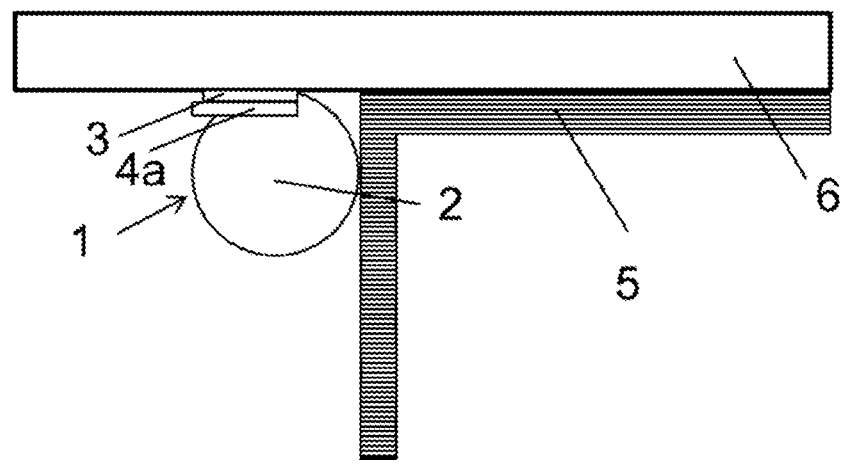
FIG. 2c shows a sketched sealing arrangement with the embodiment of an inventive joint-sealing tape shown in FIGS. 2a and 2b.
Figure 2D:
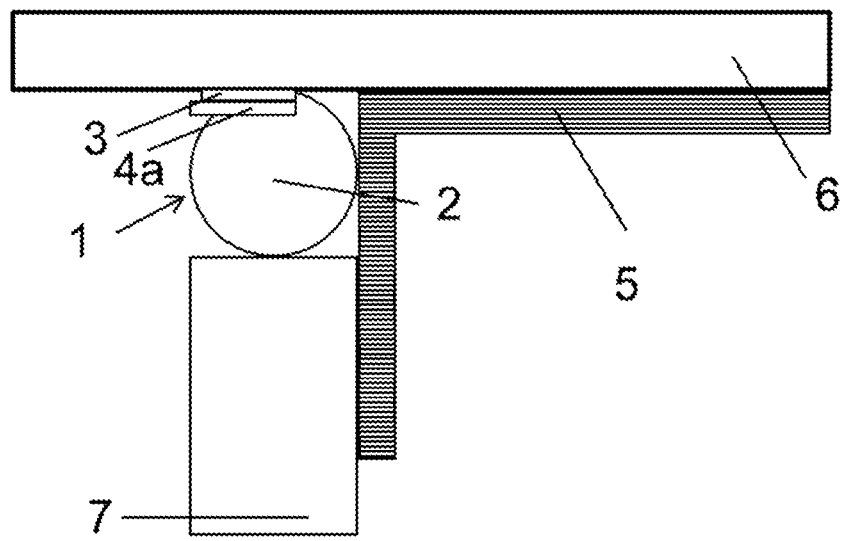
FIG. 2d shows a sectional view through a finished building element with the embodiment of an inventive sealing arrangement shown in FIG. 2c.

A further preferred embodiment of an inventive joint-sealing tape 1 is shown in FIGS. 2a and 2b. Joint-sealing tape 1 comprises a sealing element 2 and an adhesive layer 3. Sealing element 2 has a round profile and a solid profile. Furthermore, sealing element 2 is surrounded completely, i.e. over its entire circumference, by a covering layer 4. Furthermore, sealing element 2 is provided with a projecting film strip 4a. Sealing element 2 consists of a compressible foam, which if necessary contains fire-protection additives, and covering layer 4 as well as film strip 4a consists of a plastic film. FIG. 2c illustrates a sealing arrangement with the embodiment of an inventive joint-sealing tape shown in FIGS. 2a and 2b, wherein joint-sealing tape 1, after attachment of a channel profile 5, is positioned on a ceiling 6 and abuttingly with channel profile 5 and is fixed on ceiling 6. In this embodiment, adhesive layer 3 is applied on projecting film strip 4a, which is bent over and then the joint-sealing tape is applied on the building part. FIG. 2d shows a sectional view through a finished building element with the embodiment of an inventive sealing arrangement shown in FIG. 2c, wherein the sealing element is positioned in the upper region of the joint and is configured to seal the joint from the outside.

Figure 3A:
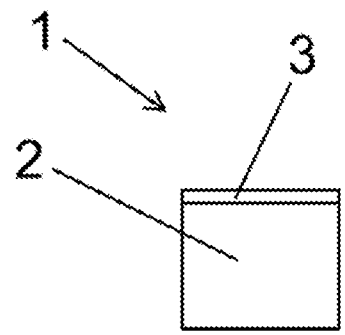
FIG. 3a shows a sketched front view of a joint-sealing tape with a sealing element and an adhesive layer according to one embodiment of the present invention, wherein the sealing element has a solid profile and rectangular profile.
Figure 3B:
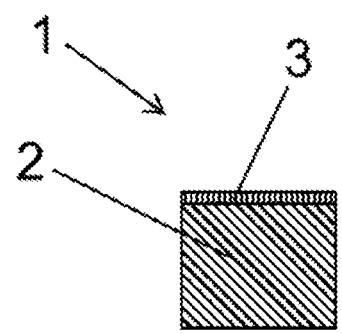
Figure 3C:
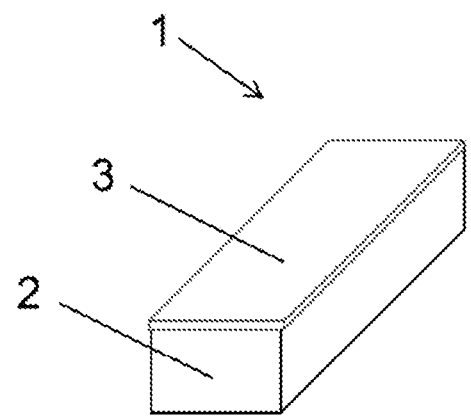
FIG. 3c shows a perspective view of the embodiment of an inventive joint-sealing tape shown in FIGS. 3a and 3b.
Figure 3D:
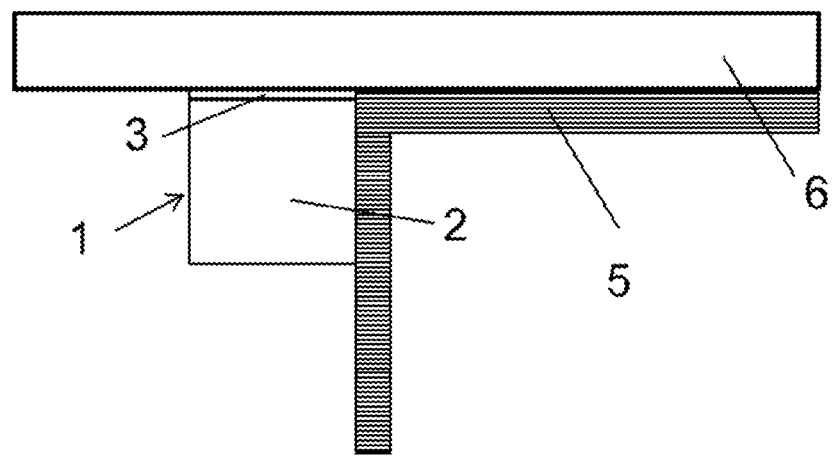
FIG. 3d shows a sketched sealing arrangement with the embodiment of an inventive joint-sealing tape shown in FIGS. 3a to 3c.
Figure 3E:
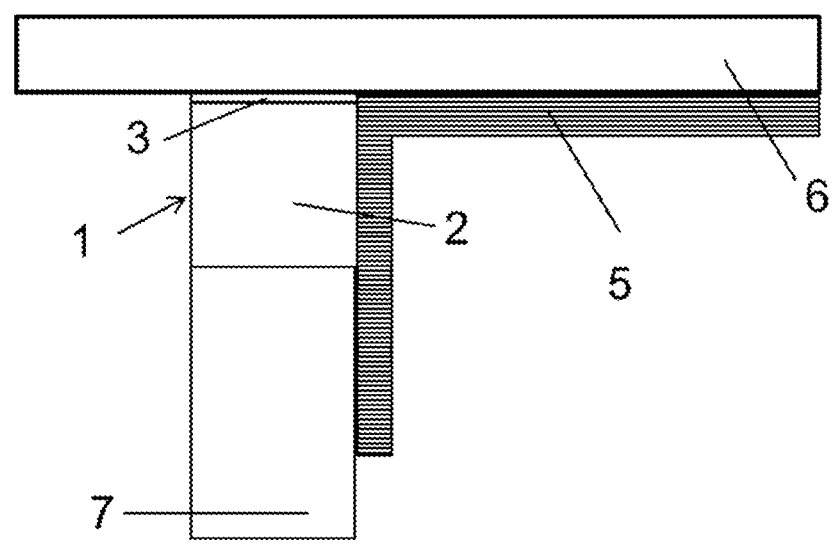
FIG. 3e shows a sectional view through a finished building element with the embodiment of an inventive sealing arrangement shown in FIG. 3d.

A further preferred embodiment of an inventive joint-sealing tape 1 is shown in FIGS. 3a to 3c. Joint-sealing tape 1 comprises a sealing element 2 and an adhesive layer 3. Sealing element 2 has a rectangular profile and a solid profile. Sealing element 2 consists of a compressible foam, which if necessary contains fire-protection additives. FIG. 3d illustrates a sealing arrangement with the embodiment of an inventive joint-sealing tape shown in FIGS. 3a to 3c, wherein joint-sealing tape 1, after attachment of a channel profile 5, is positioned on a ceiling 6 and abuttingly with channel profile 5 and is fixed on ceiling 6. FIG. 3e shows a sectional view through a finished building element with the embodiment of an inventive sealing arrangement shown in FIG. 3d, wherein the sealing element is positioned in the upper region of the joint and is configured to seal the joint from the outside.

Figure 4A:
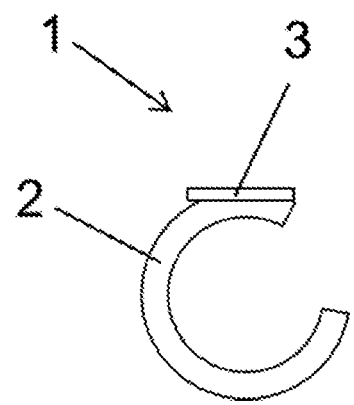
FIG. 4a shows a sketched front view of a joint-sealing tape with a sealing element and an adhesive layer according to one embodiment of the present invention, wherein the sealing element has an open hollow profile and round profile.
Figure 4B:
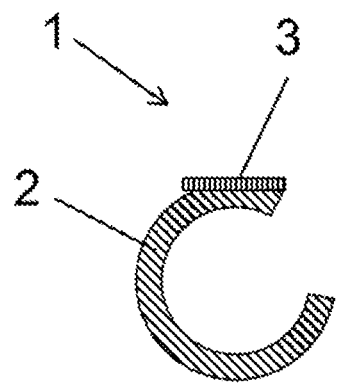
Figure 4C:
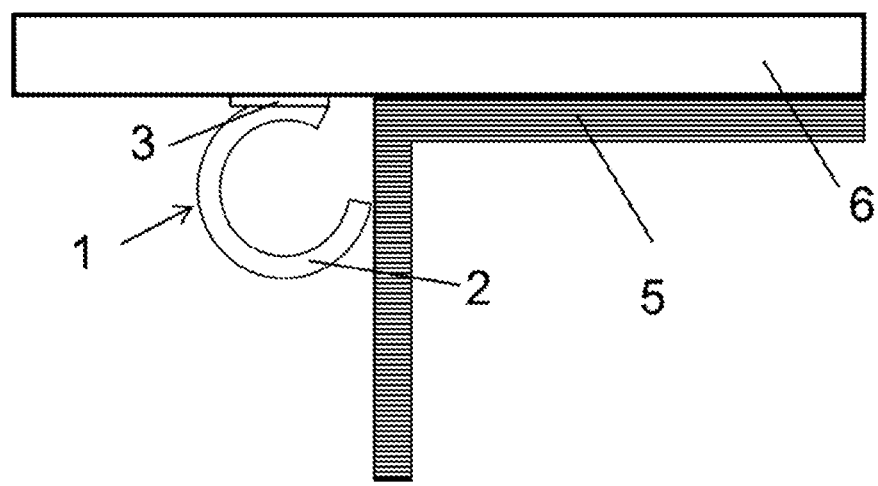
FIG. 4c shows a sketched sealing arrangement with the embodiment of an inventive joint-sealing tape shown in FIGS. 4a and 4b.
Figure 4D:
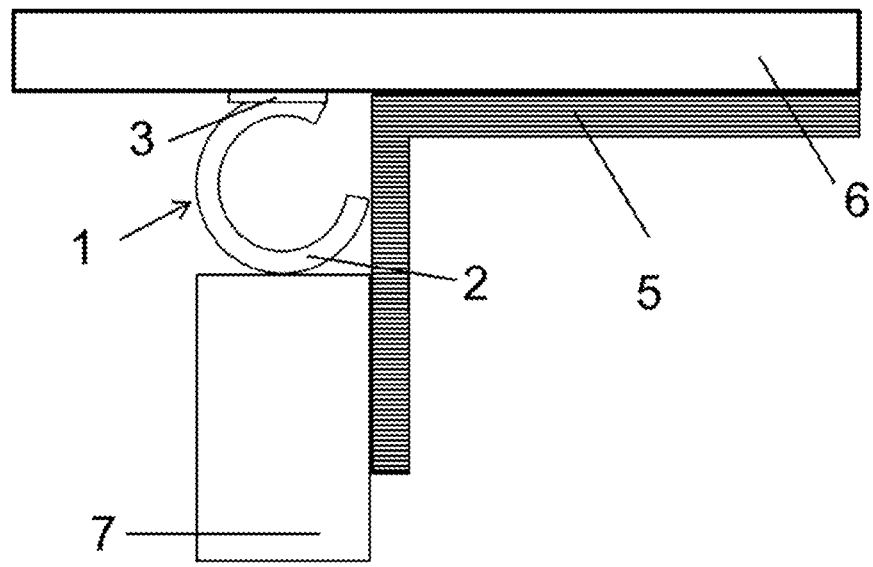
FIG. 4d shows a sectional view through a finished building element with the embodiment of an inventive sealing arrangement shown in FIG. 4c.

A further preferred embodiment of an inventive joint-sealing tape 1 is shown in FIGS. 4a and 4b. Joint-sealing tape 1 comprises a sealing element 2 and an adhesive layer 3. Sealing element 2 has an open hollow profile and a round profile. Sealing element 2 consists of a compressible foam, which if necessary contains fire-protection additives. FIG. 4c illustrates a sealing arrangement with the embodiment of an inventive joint-sealing tape shown in FIGS. 4a and 4b, wherein joint-sealing tape 1, after attachment of a channel profile 5, is positioned on a ceiling 6 and abuttingly with channel profile 5 and is fixed on ceiling 6. The open side of the hollow profile of sealing element 2 points in the direction of channel profile 5. FIG. 4d shows a sectional view through a finished building element with the embodiment of an inventive sealing arrangement shown in FIG. 4c, wherein the sealing element is positioned in the upper region of the joint and is configured to seal the joint from the outside.

Figure 5A:
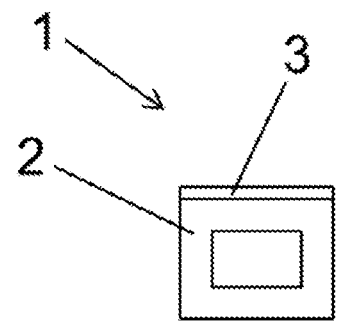
FIG. 5a shows a sketched front view of a joint-sealing tape with a sealing element and an adhesive layer according to one embodiment of the present invention, wherein the sealing element has a closed hollow profile and rectangular profile.
Figure 5B:
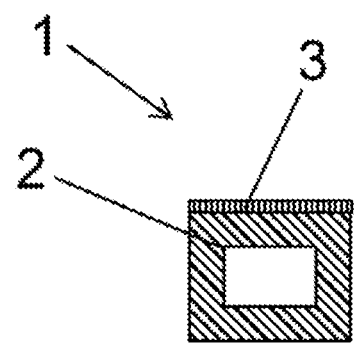
Figure 5C:
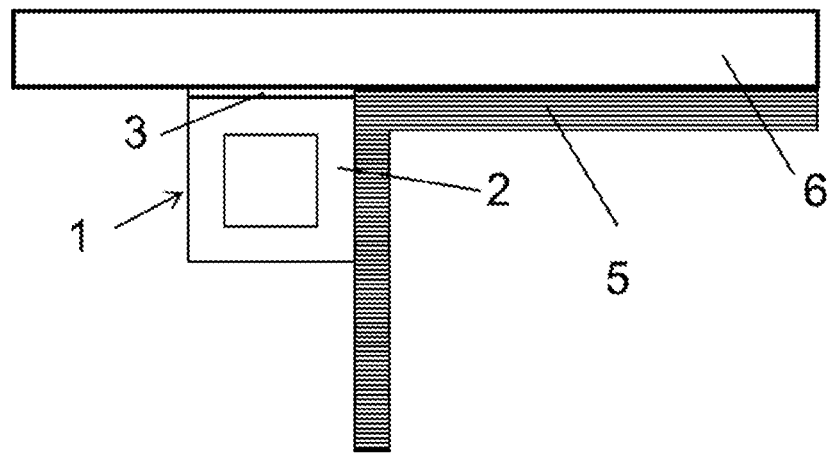
FIG. 5c shows a sketched sealing arrangement with the embodiment of an inventive joint-sealing tape shown in FIGS. 5a and 5b.
Figure 5D:
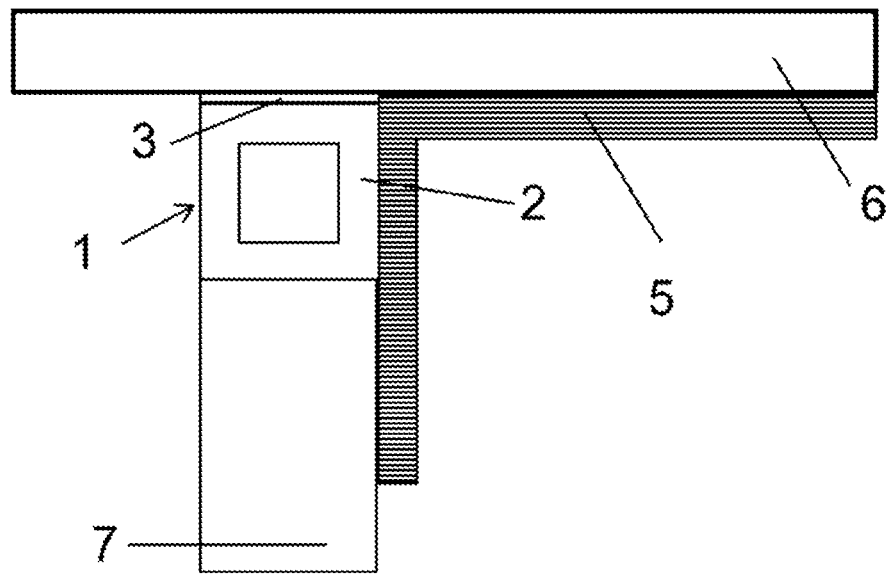
FIG. 5d shows a sectional view through a finished building element with the embodiment of an inventive sealing arrangement shown in FIG. 5c.

A further preferred embodiment of an inventive joint-sealing tape 1 is shown in FIGS. 5a and 5b. Joint-sealing tape 1 comprises a sealing element 2 and an adhesive layer 3. Sealing element 2 has a closed hollow profile and a rectangular profile. Sealing element 2 consists of a compressible foam, which if necessary contains fire-protection additives. FIG. 5c illustrates a sealing arrangement with the embodiment of an inventive joint-sealing tape shown in FIGS. 5a and 5b, wherein joint-sealing tape 1, after attachment of a channel profile 5, is positioned on a ceiling 6 and abuttingly with channel profile 5 and is fixed on ceiling 6. FIG. 5d shows a sectional view through a finished building element with the embodiment of an inventive sealing arrangement shown in FIG. 5c, wherein the sealing element is positioned in the upper region of the joint and is configured to seal the joint from the outside.

Figure 6:
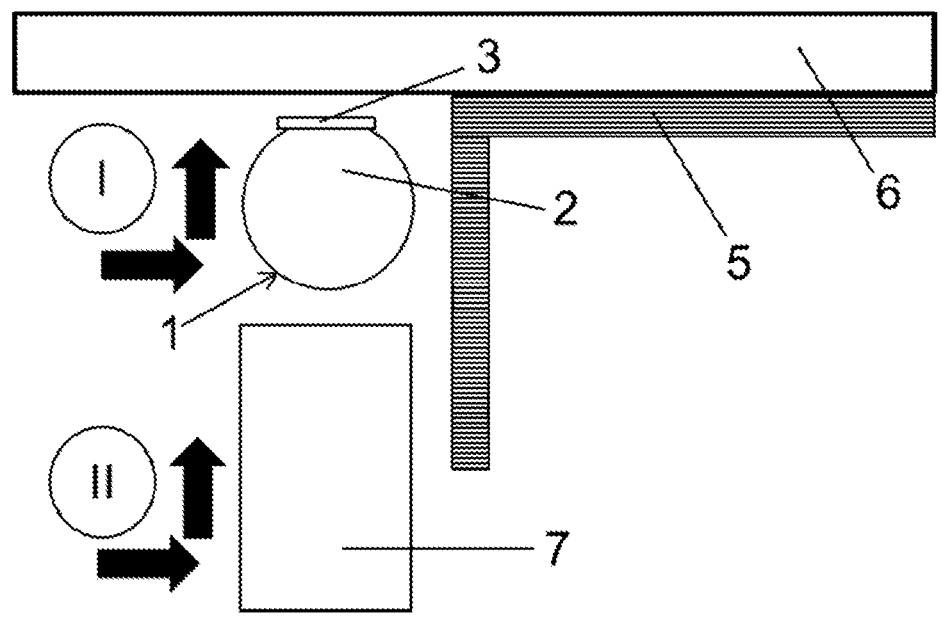
FIG. 6 shows the stepwise procedure for manufacturing a finished building element by means of the embodiment of an inventive joint-sealing tape shown in FIGS. 1a to 1c.

The stepwise procedure for manufacturing a finished building element by means of the embodiment of an inventive joint-sealing tape shown in FIGS. 1a to 1c, for sealing a gap between a ceiling 6, channel profile 5 of a drywall studwork and a gypsum board 7, is sketched in FIG. 6. Firstly, in a first step I, joint-sealing tape 1, after attachment of a channel profile 5, is positioned on a ceiling 6 and abuttingly with channel profile 5 and is fixed on ceiling 6 in the usual way, preferably by means of adhesive layer. Then, in a second step II, gypsum board 7 is applied on the flange of channel profile 5 and pushed upward in the direction of ceiling 6, whereupon a gap remains between the top edge of gypsum board 7 and ceiling 6, which is filled with sealing element 2 of joint-sealing tape 1, in order to permit vertical movement, for example, of gypsum board 7. Thereby sealing element 2 is compressed and in this way seals the gap between ceiling 6 and channel profile 5 as well as the gap between ceiling 6 and gypsum board 7. The finished structure is shown in FIG. 1e.

FIG. 6 represents an example of the procedure for manufacturing a finished building element with joint-sealing tapes according to the present invention. Each inventive joint-sealing tape may be used in this way for sealing.

As is obvious from the foregoing explanations, the inventive joint-sealing tape is particularly suitable for safely sealing a building-structure joint between two adjacent building parts in simple manner, especially against sound and/or smoke and if necessary also against fire.

Furthermore, application is very mounting-friendly, since no additional fastening of the joint-sealing element, for example to the profile or to a further connecting building part, such as a gypsum board, is necessary. Mounting is therefore conceivably easy, and the working effort for mounting the joint-sealing tape is greatly reduced. The invention therefore achieves safe and reliable sealing of joints between two building parts, especially between a profile of a drywall studwork and a building part adjacent thereto, such as, for example, a ceiling, wall or floor. In this connection, two-sided sealing can be achieved in only one operation, by providing a prefabricated joint-sealing tape.

Furthermore, it has been shown that outstanding imperviousness can be achieved with the inventive joint-sealing tape, since good compressibility of the sealing element is ensured without additional auxiliary means by the choice of the sealing materials and/or geometric configuration. By appropriate choice of the sealing materials and/or geometric configuration, the invention also makes it possible to adjust the correct spacing from the connecting building part to the gypsum board without additional auxiliary means, in order to achieve the said precompression.

By means of the inventive joint-sealing tape it is also possible to ensure that, merely by the choice of the sealing materials and/or geometric configuration, sufficient material is installed to ensure excellent imperviousness with maximum absorption of movement.

Furthermore, with the inventive joint-sealing tape, irregularities of the surface of a building part can be safely sealed as soon as one building part is disposed on another building part, since the sealing element of the joint-sealing tape is pressed sufficiently firmly against the surface of the one building part and at the same time against the side faces of the other building part.

In view of the foregoing, it is obvious that the objects of the invention have been solved. Since various modifications can be made to the sealing element described hereinabove, without departing from the scope of the invention, it is intended that all subject matters contained in the foregoing description be interpreted as illustrative and not in a restrictive sense.

The invention claimed is:

1. A joint-sealing tape for sealing a joint between a first building part and a second building part, said joint-sealing tape comprising:
    a seal including foam, sponge rubber, or cellular rubber and having a profile which is a round or polygonal profile and which is not hollow, and
    an adhesive layer including a first side directly or indirectly coupled to a first area of the seal and a second side opposing the first side, the second side including an adhesive material for attachment to the first building part, the adhesive layer unattached to a second area of the seal facing the second building part so that the second building part is free to move relative to the second area of the seal, wherein the seal has a predetermined geometry, wherein the foam, sponge rubber, or cellular rubber is an intumescent material, wherein a length of the adhesive layer is less than or substantially equal to a total length of an outer surface of the seal, and wherein the adhesive layer extends from the seal in a first direction with respect to a longitudinal axis of the seal in an uninstalled state and extends from the seal in a second direction with respect to the longitudinal axis of the seal in an installed state, the second direction extending in a same direction as a surface of the first building part and different from the first direction.

2. The joint-sealing tape according to claim 1, wherein the seal is firmly joined to a plastic film covering layer over its entire outer surface.

3. The joint-sealing tape according to claim 1, wherein the seal is provided with a projecting film.

4. The joint-sealing tape according to claim 1, wherein the adhesive layer is a self-adhesive layer.

5. The joint-sealing tape according to claim 1, wherein the seal has a round profile, the adhesive layer is a self-adhesive layer and the seal includes an open-celled polyurethane foam.

6. The joint-sealing tape according to claim 1, wherein the seal has a round profile, the adhesive layer is a self-adhesive layer and the seal includes cellular rubber.

7. The joint-sealing tape according to claim 1, wherein the seal has a rectangular profile, the adhesive layer is a self-adhesive layer and the seal includes of cellular rubber.

8. The joint-sealing tape according to claim 1, wherein the seal has a rectangular profile, the adhesive layer is a self-adhesive layer and the seal includes an open-celled polyurethane foam.

9. A sealing arrangement for sealing a joint between two juxtaposed building parts, said sealing arrangement comprising:
    at least one first building part, one second building part and a joint-sealing tape according to claim 1, wherein the seal is positioned in the upper region of the joint and is configured to seal the joint from outside.

10. The sealing arrangement according to claim 9, wherein the seal is disposed abuttingly with the first building part.

11. The sealing arrangement according to claim 9, wherein the seal is positioned and fixed on the second building part.

12. The sealing arrangement according to claim 9, wherein the first building part is a frame profile of a drywall and the second building part is a wall, a ceiling or a floor of a building structure.

13. The joint-sealing tape according to claim 1, wherein the seal is plastically deformable.

14. The joint-sealing tape according to claim 1, wherein the seal is elastically deformable.

15. The joint-sealing tape according to claim 1, wherein the seal includes an open-celled polyurethane foam.

16. The joint-sealing tape according to claim 15, further comprising a covering layer or jacket on the seal.

17. The joint-sealing tape according to claim 1, wherein the seal includes a foam which is impregnated with an impregnating agent configured to increase the sealing properties of the foam.

18. The joint-sealing tape according to claim 1, wherein the seal includes a slow-burning foam that retains at least 20% of its initial volume at temperatures of from 500 to 800° C.

19. The joint-sealing tape according to claim 1, further comprising:
    a plastic film covering layer on the seal,
    wherein the first side of the adhesive layer is indirectly coupled to the seal through the plastic film covering layer.

20. A joint-sealing tape for sealing a joint between a first building part and a second building part, said joint-sealing tape comprising:
    a seal including foam, sponge rubber, or cellular rubber and having a profile which is a round or polygonal profile and which is not hollow, and
    an adhesive layer including a first side directly or indirectly coupled to a first area of the seal and a second side opposing the first side, the second side including an adhesive material for attachment to the first building part, the adhesive layer unattached to a second area of the seal facing the second building part so that the second building part is free to move relative to the second area of the seal, wherein the seal has a predetermined geometry, wherein the foam, sponge rubber, or cellular rubber is an intumescent material, wherein a length of the adhesive layer is less than or substantially equal to a total length of an outer surface of the seal, and wherein the adhesive layer and the seal form a first angle in an uninstalled state and wherein the adhesive layer and the seal form a second angle in an installed state which is different from the first angle.

* * * * *